(12) United States Patent
Kuenzel

(10) Patent No.: US 9,388,720 B2
(45) Date of Patent: Jul. 12, 2016

(54) METHOD FOR TREATING EXHAUST GAS AND ARRANGEMENT OF AN EXHAUST GAS SYSTEM ON AN INTERNAL COMBUSTION ENGINE

(71) Applicant: Daimler AG, Stuttgart (DE)

(72) Inventor: Stefan Kuenzel, Waiblingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/418,603

(22) PCT Filed: Jul. 26, 2013

(86) PCT No.: PCT/EP2013/002227
§ 371 (c)(1),
(2) Date: Jan. 30, 2015

(87) PCT Pub. No.: WO2014/019667
PCT Pub. Date: Feb. 6, 2014

(65) Prior Publication Data
US 2015/0260068 A1    Sep. 17, 2015

(30) Foreign Application Priority Data
Aug. 1, 2012  (DE) .......................... 10 2012 015 259

(51) Int. Cl.
*F01N 3/00*   (2006.01)
*F02M 25/06*  (2006.01)
(Continued)

(52) U.S. Cl.
CPC ............ *F01N 3/0235* (2013.01); *F01N 13/107* (2013.01); *F02D 41/005* (2013.01);
(Continued)

(58) Field of Classification Search
CPC . F01N 13/107; F01N 3/0235; F01N 2240/36; F02B 37/025; F02D 41/005; F02D 41/0055; F02D 41/0082; F02D 41/0245; F02M 25/0707; F02M 25/0718; F02M 25/0719; F02M 25/0749; F02M 25/0796; Y02T 10/26; Y02T 10/47
USPC .................... 60/278, 280, 286, 295, 297, 311
See application file for complete search history.

(56) References Cited

U.S. PATENT DOCUMENTS 4,179,892 A * 12/1979 Heydrich ................ F02B 37/00
                                                      60/605.2
5,517,976 A    5/1996 Bächle et al.
(Continued)

FOREIGN PATENT DOCUMENTS

AT         503 869 A2    1/2008
DE    197 30 403 C1   10/1998
(Continued)

OTHER PUBLICATIONS

International Search Report (PCT/ISA/220 and PCT/ISA/210) dated Jan. 22, 2014 with English translation (eight pages).
(Continued)

*Primary Examiner* — Jesse Bogue
*Assistant Examiner* — Diem Tran
(74) *Attorney, Agent, or Firm* — Crowell & Moring LLP

(57) ABSTRACT

A method for treating exhaust gas of an internal combustion engine involves introducing less fuel into at least one first cylinder of the internal combustion engine than into at least one second cylinder of the internal combustion engine. Exhaust gas emerging from the at least one first cylinder is at least partially recycled into a supply air section of the internal combustion engine. At least the exhaust gas of the at least one second cylinder is supplied to an exhaust gas after-treatment unit. An exhaust gas line, by means of which exhaust gas of the at least one first cylinder of the exhaust gas after treatment unit can be supplied, is at least partially blocked.

9 Claims, 2 Drawing Sheets

Figure 1:
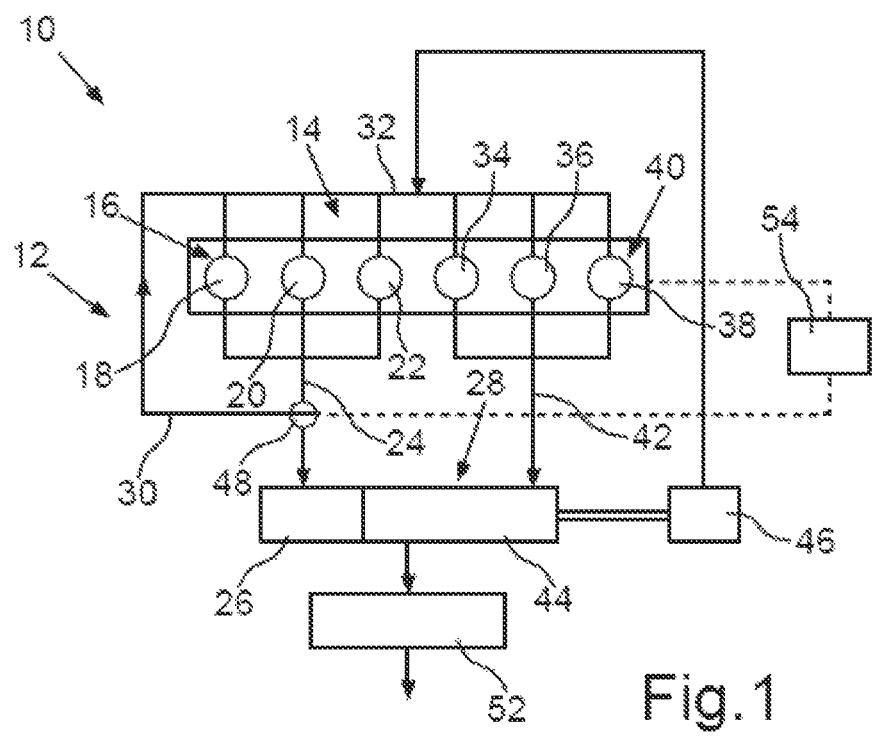

(51) Int. Cl.
*F01N 3/02* (2006.01)
*F01N 3/023* (2006.01)
*F02D 41/00* (2006.01)
*F02D 41/02* (2006.01)
*F01N 13/10* (2010.01)
*F02M 25/07* (2006.01)
*F02B 37/02* (2006.01)

(52) U.S. Cl.
CPC ........ *F02D41/0055* (2013.01); *F02D 41/0082* (2013.01); *F02D 41/0245* (2013.01); *F02M 25/0707* (2013.01); *F02M 25/0719* (2013.01); *F02M 25/0749* (2013.01); *F02M 25/0796* (2013.01); *F02M 26/16* (2016.02); *F02M 26/43* (2016.02); *F01N 2240/36* (2013.01); *F02B 37/025* (2013.01); *F02M 25/0718* (2013.01); *Y02T 10/26* (2013.01); *Y02T 10/47* (2013.01)

(56) References Cited

U.S. PATENT DOCUMENTS

| | | | | |
|---|---|---|---|---|
| 6,141,959 | A * | 11/2000 | Digeser | F01N 3/0842 60/274 |
| 6,871,642 | B1 * | 3/2005 | Osterwald | F02B 37/025 123/559.1 |
| 6,978,602 | B2 * | 12/2005 | Ohtake | F02D 41/029 60/285 |
| 7,036,305 | B2 * | 5/2006 | Nishimura | F01N 3/035 60/286 |
| 7,062,906 | B2 * | 6/2006 | Otake | F01N 9/002 60/274 |
| 7,246,485 | B2 * | 7/2007 | Ohki | F01N 3/0222 60/285 |
| 7,454,897 | B2 * | 11/2008 | Mizuguchi | F02D 31/008 60/278 |
| 8,683,977 | B2 | 4/2014 | Miyashita | |
| 2005/0241299 | A1 | 11/2005 | Brown | |
| 2008/0009997 | A1 | 1/2008 | Ketterer et al. | |
| 2011/0023829 | A1 | 2/2011 | Miyashita | |
| 2011/0067397 | A1 | 3/2011 | Hirth et al. | |
| 2012/0078492 | A1 | 3/2012 | Freund et al. | |

FOREIGN PATENT DOCUMENTS

| | | |
|---|---|---|
| DE | 10 2004 043 529 B3 | 9/2005 |
| DE | 10 2005 017 099 A1 | 11/2005 |
| EP | 2 206 898 A1 | 7/2010 |
| EP | 2 295 769 A1 | 3/2011 |
| JP | 60-65239 A | 4/1985 |
| JP | 60-153414 A | 8/1985 |
| JP | 60-184918 A | 9/1985 |
| JP | 7-54715 A | 2/1995 |
| JP | 10-61503 A | 3/1998 |
| JP | 2001-152830 A | 6/2001 |
| JP | 2002-362195 A | 12/2002 |
| JP | 2004-137968 A | 5/2004 |
| JP | 2004-251172 A | 9/2004 |
| JP | 2006-46253 A | 2/2006 |
| JP | 2009-257123 A | 11/2009 |
| JP | 2012-500356 A | 1/2012 |
| JP | 2013-537955 A | 10/2013 |
| WO | WO 2010/020322 A1 | 2/2010 |

OTHER PUBLICATIONS

German-language Written Opinion (PCT/ISA/237) dated Jan. 22, 2014 (six pages).
German Search Report dated Jul. 5, 2013 with partial English translation (10 pages).
Japanese Office Action issued in Japanese counterpart application No. 2015-524663 dated Dec. 15, 2015, with partial English translation (Twelve (12) pages).

* cited by examiner

METHOD FOR TREATING EXHAUST GAS AND ARRANGEMENT OF AN EXHAUST GAS SYSTEM ON AN INTERNAL COMBUSTION ENGINE

BACKGROUND AND SUMMARY OF THE INVENTION

Exemplary embodiments of the invention are directed to a method for treating exhaust gas, and arrangement of an exhaust gas system on an internal combustion engine. Specifically, exemplary embodiments of the invention relate to a method for treating exhaust gas of an internal combustion engine, in which less fuel is introduced into at least one first cylinder of the internal combustion engine than into at least one second cylinder of the internal combustion engine. Exhaust gas exiting from the at least one first cylinder is at least partially recycled into an intake air tract of the internal combustion engine. At least the exhaust gas of the at least one second cylinder is supplied to an exhaust gas aftertreatment unit. Exemplary embodiments of the invention further relate to an arrangement of an exhaust gas system on an internal combustion engine of a vehicle.

European patent document EP 2 206 898 A1 describes a method for aftertreatment of the exhaust gas of a multi-cylinder internal combustion engine of a vehicle, in which during low-load operation of the internal combustion engine a first group of cylinders is acted on by fuel, while a second group of cylinders is acted on by less fuel or no fuel at all. An exhaust gas line leads from each of the two cylinder groups to a respective duct of a two-duct turbine of an exhaust gas turbocharger. An exhaust gas recirculation line branches off from each of these two exhaust gas lines, the quantity of exhaust gas flowing through each of these exhaust gas recirculation lines being separately adjustable. The intake air for the internal combustion engine, which is compressed by a compressor of the exhaust gas turbocharger, is supplied to the respective cylinder groups via a separate intake air line, a throttle valve being situated in each of the two intake air lines. During hot operation, the cylinder group, into whose cylinders less fuel, or no fuel at all, is injected, is now acted on by a throttled supply air flow, and an exhaust gas recirculation valve of the exhaust gas recirculation line associated with this cylinder group is opened. In contrast, the exhaust gas of the cylinders of the other cylinder group is not recycled, but instead is returned to the turbine of the exhaust gas turbocharger. As a result, comparatively hot exhaust gas flows through the turbine, and flows further to a catalytic converter.

In this arrangement, a plurality of lines with respective throttle elements is necessary to achieve the desired increase in the temperature of the exhaust gas, which is very complicated.

Exemplary embodiments of the present invention, therefore, are directed to a method and an arrangement of the type mentioned at the outset that allow an increase in the exhaust gas temperature in a particularly simple manner.

In the method according to the invention, an exhaust gas line via which exhaust gas of the at least one first cylinder is suppliable to the exhaust gas aftertreatment unit is at least partially blocked. This ensures that at best, a small portion of exhaust gas originating from the at least one first cylinder, which is operated with a low quantity of fuel or a quantity of fuel that is reduced to zero, reaches the exhaust gas aftertreatment unit. In contrast, the exhaust gas originating from the at least one second cylinder contributes to a greater extent to the temperature of the exhaust gas supplied to the exhaust gas aftertreatment unit. This is achieved in a particularly simple manner, namely, by blocking the exhaust gas line associated with the at least one first cylinder. Thus, separate intake air lines and throttle units for throttling are not necessary for the at least one first cylinder and the at least one second cylinder. Nevertheless, the at least one first cylinder having the injection quantity that is reduced, in particular to zero, makes practically no contribution to the temperature of the exhaust gas.

The effective exhaust gas recirculation rate drops due to the reduction in the quantity of fuel introduced into the at least one first cylinder of the internal combustion engine. This is because for the intake air that is supplied to the at least one first cylinder, less fuel is available that may be converted into exhaust gas. Due to the reduction in the exhaust gas recirculation rate, the soot emissions of the internal combustion engine are also greatly lowered. In addition, a comparatively large quantity of nitrogen oxides is formed which, after oxidation of NO to $NO_2$, is available for oxidizing, for example, soot particles retained in a particle filter. Passive regeneration of the particle filter may thus be achieved in a simple manner. Thus, for the regeneration of the particle filter it is not necessary to additionally provide the internal combustion engine with a metering device for introducing fuel into the exhaust gas.

The temperature of the exhaust gas supplied to the exhaust gas aftertreatment unit may thus be increased in a particularly effective manner. Post-injection into the cylinders of the internal combustion engine may therefore be dispensed with. This is advantageous, since due to the late point in time of such a post-injection, the cylinder walls may be wetted with fuel, which in turn may result in mechanical problems due to the accompanying dilution of the motor oil. In addition, a throttle valve in the intake air tract of the internal combustion engine may be dispensed with, so that the costs associated with such a throttle valve and possible problems with the reliability of such a throttle valve are avoided. The method is thus characterized by particularly high reliability and cost advantages.

However, due to the asymmetrical injection, in which less fuel is introduced into the at least one first cylinder of the internal combustion engine than into the at least one second cylinder of the internal combustion engine, not only it is possible to achieve an increase in the temperature of the exhaust gas in a particularly simple manner, but there is also the option to attain a comparatively high exhaust gas recirculation rate when this is desired. For this purpose, more fuel is then injected into the at least one cylinder, whose exhaust gas is recirculated, than into the at least one cylinder whose exhaust gas is not recirculated.

A particularly simple design of the exhaust gas system may be achieved when, according to one advantageous embodiment of the invention, the quantity of exhaust gas that is recycled into the intake air tract of the internal combustion engine is adjusted by means of an adjusting device that is designed for at least partially blocking or opening up the exhaust gas line. In other words, the adjusting device is used not only for blocking the exhaust gas line, but at the same time is also used as an exhaust gas recirculation valve. A defined distribution of the exhaust gas flow of the at least one first cylinder, which is operated with a particularly small quantity of fuel or no fuel at all, over an exhaust gas recirculation line and the exhaust gas line leading to the exhaust gas aftertreatment unit may be achieved in a particularly simple manner. This makes the method particularly easy to carry out.

It has also been shown to be advantageous when the internal combustion engine is operated in a low to medium load range, so that the exhaust gas line is completely blocked, and the exhaust gas exiting from the at least one first cylinder is completely recycled into the intake air tract of the internal combustion engine. The exhaust gas exiting from the at least one first cylinder then has no influence on the temperature of the exhaust gas which is present upstream from the exhaust gas aftertreatment unit.

This complete recycling of the exhaust gas into the intake air tract may be carried out in particular up to a medium load range of up to 800 Nm, for example, since the exhaust gas recirculation rate is reduced due to the decreased quantity of exhaust gas leaving the at least one first cylinder. In contrast, for an internal combustion engine in which all cylinders are acted on by the same quantity of fuel, complete recycling of the exhaust gas may take place only in a comparatively low load range, for example in a load range of up to approximately 400 Nm, without impairing the operation of the internal combustion engine.

Furthermore, it has been shown to be advantageous when the amount of fuel that is introduced into the at least one second cylinder is greater by the amount of lesser fuel that is introduced into the at least one first cylinder. A torque of the internal combustion engine is thus at least essentially maintained, which is achievable when the quantity of fuel to be provided for this torque is uniformly distributed over the cylinders of the internal combustion engine. Thus, despite the asymmetrical injection, the torque of the internal combustion engine does not decrease.

It is also advantageous when the at least one first cylinder and the at least one second cylinder are each supplied with intake air via the same intake air tract. It is therefore not necessary to provide complicated, separate intake air lines, so that a particularly simple design of the intake air tract is achieved.

In another advantageous embodiment of the invention, the cylinders of the internal combustion engine are supplied with the intake air unthrottled. Namely, providing a throttling device in the intake tract may thus be dispensed with, and controlling the air supply to the internal combustion engine is simplified.

A particle filter as the exhaust gas aftertreatment unit is preferably regenerated when the exhaust gas line is at least partially blocked. It is thus possible to provide an active regeneration of the particle filter, i.e., a regeneration by fuel that is additionally introduced into the exhaust gas but not already combusted in the internal combustion engine, or also a passive regeneration, in which the soot retained in the particle filter is oxidized by nitrogen dioxide.

Lastly, it has been shown to be advantageous when exhaust gas is suppliable to a first duct of a turbine of an exhaust gas turbocharger via the blockable exhaust gas line, while exhaust gas of the at least one second cylinder is supplied to a second duct of the turbine via a second exhaust gas line. It is thus ensured that in any event, exhaust gas from the at least one first cylinder mixes with exhaust gas from the at least one second cylinder, downstream from the turbine. At this location the exhaust gas may be supplied to the two ducts of an asymmetrical turbine in order to provide the internal combustion engine with this compressed intake air over a particularly large operating range.

In the arrangement according to the invention of an exhaust gas system on an internal combustion engine of a vehicle, the internal combustion engine has at least one first cylinder and at least one second cylinder. By means of a control device, the first and second cylinders may be acted on by quantities of fuel that are different from one another. Exhaust gas exiting from the at least one first cylinder is at least partially recyclable into an intake air tract of the internal combustion engine via an exhaust gas recirculation line. The exhaust gas recirculation line branches off from a first exhaust gas line, via which exhaust gas of the at least one first cylinder is suppliable to an exhaust gas aftertreatment unit. The exhaust gas of the at least one second cylinder is suppliable to the exhaust gas aftertreatment unit via a second exhaust gas line. An adjusting device by means of which the first exhaust gas line may be at least partially blocked or opened up is situated in the first exhaust gas line. By means of the control device, asymmetrical injection into the first cylinder and the second cylinder is achievable, and by blocking the first exhaust gas line, primarily the exhaust gas from the at least one second cylinder is supplied to the exhaust gas aftertreatment unit. In this way, comparatively hot exhaust gas may be supplied, even under low load, to the exhaust gas aftertreatment unit using particularly simple means, namely, by utilizing the adjusting device. Thus, even under low load of the internal combustion engine, the exhaust gas aftertreatment unit may be brought to its light-off temperature, at which in particular it substantially converts or treats pollutants contained in the exhaust gas. When the exhaust gas aftertreatment unit is a particle filter, the particle filter may be regenerated by increasing the exhaust gas temperature.

The quantity of exhaust gas that is recyclable into the intake air tract of the internal combustion engine via the first exhaust gas line is preferably adjustable by means of the adjusting device. It is then necessary to provide only one such adjusting device for blocking the first exhaust gas line, and at the same time, for adjusting the exhaust gas recirculation rate.

The advantages and preferred embodiments described for the method according to the invention also apply to the arrangement according to the invention, and vice versa.

The features and feature combinations mentioned above in the description as well as the features and feature combinations mentioned below in the description of the figures and/or only shown in the figures may be used not only in the particular stated combination, but also in other combinations or alone without departing from the scope of the invention.

BRIEF DESCRIPTION OF THE DRAWING FIGURES

Figure 2:
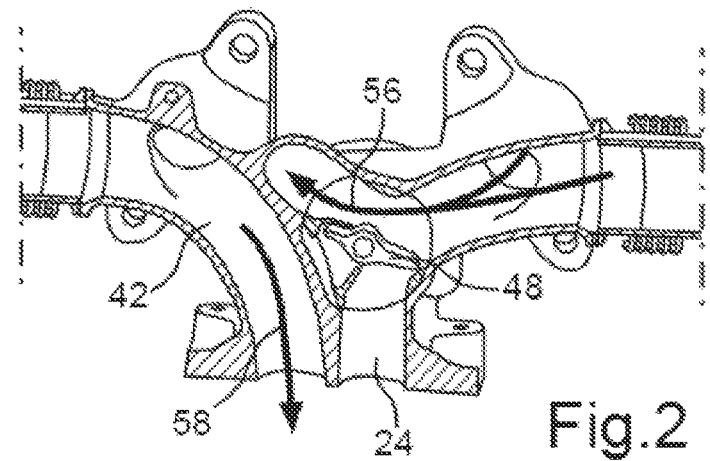
Figure 3:
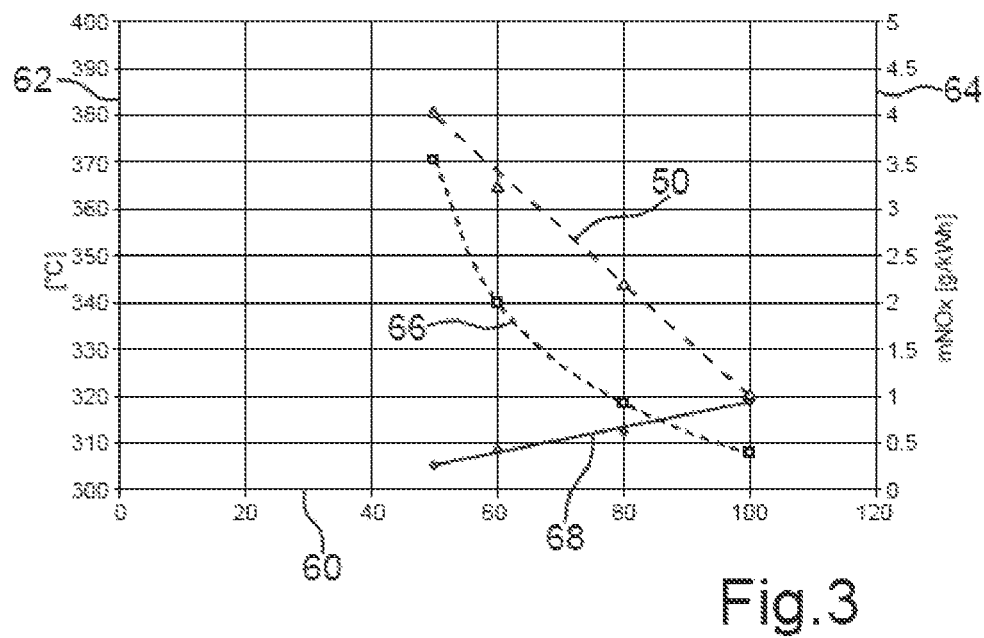

Further advantages, features, and particulars of the invention result from the claims, the following description of preferred embodiments, and with reference to the drawings, which show the following:

FIG. 1 schematically shows an internal combustion engine of a motor vehicle in which the exhaust gas from two cylinder groups is supplied via respective exhaust gas lines to a turbine of an exhaust gas turbocharger, whereby one of the two exhaust gas lines through which exhaust gas from a cylinder group flows may be blocked by means of an exhaust gas recirculation valve, and reduced quantities of fuel act on the cylinder groups;

FIG. 2 shows a portion of a sectional detailed view of the two exhaust gas lines together with the exhaust gas recirculation valve situated in one of the two exhaust gas lines; and FIG. 3 shows curves depicting the increase in the exhaust gas temperature and the nitrogen oxide content, as well as the decrease in soot emissions of the internal combustion engine, as a function of the asymmetrical injection into the two cylinder groups.

DETAILED DESCRIPTION

FIG. 1 schematically shows an arrangement 10 of an exhaust gas system 12 on an internal combustion engine 14 of a motor vehicle, which may in particular be a utility vehicle. The internal combustion engine 14 includes a first cylinder group 16, which in the present case has three first cylinders 18, 20, 22.

The exhaust gas from these three first cylinders 18, 20, 22 is supplied via a first exhaust gas line 24 to a first, small duct 26 of an asymmetrical turbine 28 of an exhaust gas turbocharger. An exhaust gas recirculation line 30 via which recycled exhaust gas is introduced into an intake air tract 32 of the internal combustion engine 14 branches off from the first exhaust gas line 24.

The three cylinders 18, 20, 22 of the first cylinder group 16, under low load of the internal combustion engine 14, are acted on by a smaller quantity of fuel than three further cylinders 34, 36, 38 of a second cylinder group 40 of the internal combustion engine 14. The exhaust gas flowing from this cylinder group 40 having the second cylinders 34, 36, 38 is supplied via a second exhaust gas line 42 to a second, larger duct 44 of the turbine 28. No exhaust gas recirculation line branches off from this second exhaust gas line 42 to the intake air tract 32.

The intake air, which has an air to fuel ratio $\lambda > 1$ and is unthrottled, and which is compressed by a compressor 46 of the exhaust gas turbocharger, is supplied to the first cylinders 18, 20, 22 and to the second cylinders 34, 36, 38.

The asymmetrical injection into the cylinders of the two cylinder groups 16, 40 takes place in such a way that the amount of fuel that is introduced into the first cylinders 18, 20, 22 is greater by the amount of lesser fuel that is introduced into the second cylinders 34, 36, 38, in order to maintain a torque of the internal combustion engine 14 that is achievable with this overall injected quantity of fuel.

The asymmetrical injection is used to increase the temperature of the exhaust gas exiting from the turbine 28. To achieve this, even under low load of the internal combustion engine 14, the first exhaust gas line 24 is completely blocked by means of an adjusting device in the form of an exhaust gas recirculation valve 48, and the exhaust gas flowing from the first cylinders 18, 20, 22 is thus completely recycled into the intake air tract 32. The temperature of the exhaust gas exiting from the turbine 28 is therefore influenced solely by the quantity of fuel that is injected into the second cylinders 34, 36, 38, i.e., the cylinders of the second cylinder group 40. As the result of the exhaust gas that exits from the cylinders 18, 20, 22 of the first cylinder group 16 not contributing to the temperature of the exhaust gas downstream from the turbine 28, a particularly efficient and pronounced increase in temperature of the exhaust gas may be achieved due to the asymmetrical injection.

Due to decreasing the quantity of fuel injected into the first cylinders 18, 20, 22, in particular due to decreasing this quantity of fuel to zero, in addition the exhaust gas recirculation rate is lowered. This results in a marked decrease in the soot emissions of the internal combustion engine 14, and at the same time results in an increase in the nitrogen oxides content in the exhaust gas.

As the result of completely opening the exhaust gas recirculation valve 48, which at the same time causes complete blocking of the first exhaust gas line 24 in the direction of the smaller duct 26 of the turbine 28, no exhaust gas is introduced into this smaller, first duct 26 of the turbine 28. This causes an increase in the temperature of the exhaust gas exiting from the turbine 28, since the turbine 28 is supplied only with the exhaust gas from the second cylinder group 40, which is acted on by an increased quantity of fuel. The temperature of the exhaust gas exiting from the first cylinders 18, 20, 22 thus has no influence on the exhaust gas temperature downstream from the turbine 28, as illustrated by a curve 50 in FIG. 3.

The decrease in the quantity of fuel introduced into the first cylinders 18, 20, 22 is equal to the increase in the quantity of fuel introduced into the second cylinders 34, 36, 38, and thus results in the desired temperature increase. The hot exhaust gas then flows to an exhaust gas aftertreatment unit in the form of a particle filter 52. The particle filter 52 may thus be actively regenerated in that the soot particles retained in the particle filter are burned off in a controlled manner at the increased temperature of the exhaust gas. Passive regeneration of the particle filter 52 by $NO_2$ which is formed by an oxidation catalytic converter (not shown) is also possible. Such an oxidation catalytic converter is customarily situated upstream from the particle filter 52.

As the result of achieving a reduced exhaust gas recirculation rate by decreasing the quantity of fuel injected into the first cylinders 18, 20, 22, the exhaust gas may be recycled by completely opening the exhaust gas recirculation valve 48, even up to medium load ranges of the internal combustion engine 14, for example up to a load of 800 Nm.

The control of the exhaust gas recirculation valve 48 and of injectors that inject the fuel into the cylinders 18, 20, 22, 34, 36, 38 is carried out by means of a control device 54 of the arrangement 10.

The manner in which an exhaust gas flow originating from the first cylinders 18, 20, 22 may be completely recycled by blocking the first exhaust gas line 24 by means of the exhaust gas recirculation valve 48 is particularly apparent from FIG. 2, this recycled exhaust gas flow being depicted by a flow arrow 56. Similarly, a flow arrow 58 depicts the flow of the exhaust gas originating from the second cylinders 34, 36, 38, via the second exhaust gas line 42, to the turbine 28 of the exhaust gas turbocharger.

The exhaust gas recirculation valve 48, which acts as a 3/2-way control valve, allows the defined distribution of the exhaust gas flow from the cylinder group 16, which is operated with a smaller quantity of fuel, to the exhaust gas recirculation line 30 on the one hand, and supplying to the first duct 26 of the turbine 48 on the other hand. As is apparent from FIG. 2, this control valve is preferably situated in the exhaust manifold. During hot operation, thus, when particularly hot exhaust gas is to be supplied to the particle filter 52 under low load of the internal combustion engine 14, preferably the complete exhaust gas flow from the cylinder group 16, into which the smaller quantity of fuel or no fuel at all is introduced, is led into the exhaust gas recirculation line 30, and the supply line to the smaller duct 26 of the turbine 28 is blocked.

The effects of the asymmetrical injection into the cylinders groups 16, 40 as described above are depicted in a graph shown in FIG. 3. The asymmetry of the injected quantity of fuel is indicated in % on the abscissa 60, the total quantity of fuel injected into the first cylinders 18, 20, 22 relating to the total quantity of fuel injected into the second cylinders 34, 36, 38. Temperature in ° C. is indicated on a first ordinate 62, the curve 50 depicting the temperature at the outlet of the turbine 28 as a function of the asymmetrical injection. Accordingly, the temperature increases sharply and essentially linearly with increasing asymmetry.

The nitrogen oxides content of the exhaust gas is indicated on a second ordinate 64, in the present case expressed in g/kWh of delivered power of the internal combustion engine 14. A curve 66 depicts the disproportionately strongly increasing quantity of nitrogen oxides in the exhaust gas with increasing asymmetry of the injection. Another curve 68 indicates the soot emissions of the internal combustion engine 14.

Based on this curve 68, which, like the curve 50, is essentially linear, it is apparent that the soot content of the exhaust gas decreases with increasing asymmetry of the injection.

The curves 50, 66, 68 shown in the graph in FIG. 3 are based on operation of the internal combustion engine 14 at 460 Nm and 1300 rpm.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

10 Arrangement
12 Exhaust gas system
14 Internal combustion engine
16 Cylinder group
18 Cylinder
20 Cylinder
22 Cylinder
24 Exhaust gas line
26 Duct
28 Turbine
30 Exhaust gas recirculation line
32 Intake air tract
34 Cylinder
36 Cylinder
38 Cylinder
40 Cylinder group
42 Exhaust gas line
44 Duct
46 Compressor
48 Exhaust gas recirculation valve
50 Curve
52 Particle filter
54 Control device
56 Flow arrow
58 Flow arrow
60 Abscissa
62 Ordinate
64 Ordinate
66 Curve
68 Curve

The invention claimed is:

1. A method for treating exhaust gas of an internal combustion engine, the method comprising:
supplying exhaust gas from at least one first cylinder of the internal combustion engine via a first exhaust gas line to a first, small duct of an asymmetrical turbine of an exhaust gas turbocharger, and onto a particle filter; and
supplying exhaust gas from at least one second cylinder of the internal combustion engine via a second exhaust gas line to a second, larger duct of the turbine, and onto the particle filter,
wherein when it is determining that the particle filter should be regenerated the method further comprises
introducing less fuel into the at least one first cylinder than into the at least one second cylinder,
at least partially recycling the exhaust gas exiting from the at least one first cylinder into an intake air tract of the internal combustion engine,
completely supplying the exhaust gas of the at least one second cylinder to the particle filter,
at least partially blocking the exhaust gas line via which the exhaust gas of the at least one first cylinder is supplied to the particle filter,
dispensing with post-injection into the at least one first cylinder and into the at least one second cylinder, wherein an amount of fuel introduced into the at least one second cylinder is greater by a reduction in fuel introduced into the at least one first cylinder, wherein a torque of the internal combustion engine is at least essentially maintained at a level achievable when a quantity of fuel to be provided for the torque is uniformly distributed over the both the at least one first and at least one second cylinders of the internal combustion engine.

2. The method of claim 1, wherein a quantity of exhaust gas recycled into the intake air tract of the internal combustion engine is adjusted by an adjusting device configured to at least partially block or open up the exhaust gas line.

3. The method of claim 2, wherein the internal combustion engine is operated in a low to medium load range, so that the exhaust gas line is completely blocked, and the exhaust gas exiting from the at least one first cylinder is completely recycled into the intake air tract of the internal combustion engine.

4. The method of claim 1, wherein the internal combustion engine is operated in a low to medium load range, so that the first exhaust gas line is completely blocked, and the exhaust gas exiting from the at least one first cylinder is completely recycled into the intake air tract of the internal combustion engine.

5. The method of claim 4, wherein the internal combustion engine is operated in a load range of 400 Nm to 800 Nm.

6. The method of claim 1, wherein the at least one first cylinder and the at least one second cylinder are each supplied with intake air via a same intake air tract.

7. The method of claim 1, wherein the at least one first and at least one second cylinders of the internal combustion engine are supplied with unthrottled intake air.

8. The method of claim 1, wherein the exhaust gas of the at least one first cylinder mixes with the exhaust gas of the at least one second cylinder at the most downstream from the turbine.

9. The method of claim 1, wherein a total quantity of fuel that is injected into the at least one first cylinder is 40% to 100% of a total quantity of fuel that is injected into the at least one second cylinder.

* * * * *